United States Patent
Malnati et al.

(10) Patent No.: US 9,037,517 B2
(45) Date of Patent: May 19, 2015

(54) AUTOMATION AND STREAMLINING OF RECRUITING AND BACKGROUND SCREENING VIA BI-DIRECTIONAL COMMUNICATION AND PROCESS INTEGRATION

(75) Inventors: Stefano Malnati, La Jolla, CA (US); Prasanna Vinjamuri, Sunnyvale, CA (US)

(73) Assignee: Hireright, Inc., Irvine, CA (US)

( * ) Notice: Subject to any disclaimer, the term of this patent is extended or adjusted under 35 U.S.C. 154(b) by 1741 days.

(21) Appl. No.: 11/700,697

(22) Filed: Jan. 30, 2007

(65) Prior Publication Data
US 2008/0052098 A1 Feb. 28, 2008

Related U.S. Application Data

(60) Provisional application No. 60/817,840, filed on Jun. 29, 2006.

(51) Int. Cl.
*G06Q 10/10* (2012.01)
*G06Q 10/06* (2012.01)

(52) U.S. Cl.
CPC ............... *G06Q 10/10* (2013.01); *G06Q 10/06* (2013.01); *G06Q 10/1053* (2013.01)

(58) Field of Classification Search
USPC .............................................. 705/1, 320, 321
See application file for complete search history.

(56) References Cited

U.S. PATENT DOCUMENTS

2003/0163544 A1* 8/2003 Wookey et al. ............... 709/217

OTHER PUBLICATIONS www.HireRight.com (pages documented at the Internet Archive at Jun. 2, 2005, hereinafter referred to as "HireRight").*

* cited by examiner

*Primary Examiner* — Gabrielle McCormick
(74) *Attorney, Agent, or Firm* — Arnold & Porter LLP

(57) ABSTRACT

A system includes an integration framework proxy and an integration framework. The integration framework proxy and the integration framework provide for integration of an applicant tracking system with a background screening system. Such integration permits bi-directional communication between the applicant tracking system and the background screening system to occur.

23 Claims, 17 Drawing Sheets

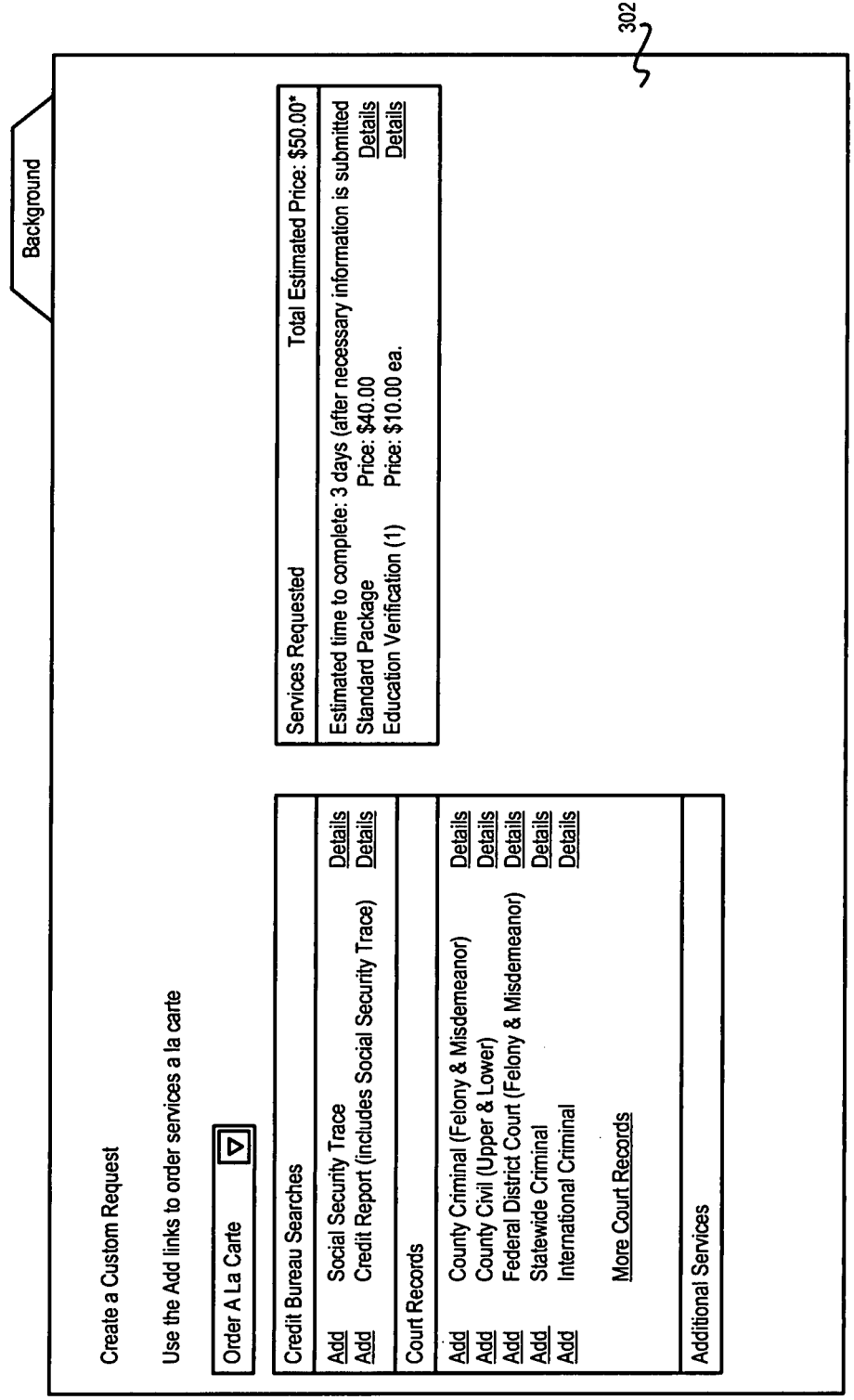

FIG 4

General Information

First Name:*
| Bob |

Middle Name:
| |

Last Name:*
| Jones |

Date of Birth (MM/DD/YYYY):
| |

Street Address:
| 1234 Anywhere Street |

City:*
| Hertfordshire |

Country of Current Residence:*
| United Kingdom ▽ |

SSN#*/Personal ID:
| | ⚠

State/Province:*
| | ⚠

Zip/Postal Code:
| SG64JU |

Phone:
| 01462 555555 |

Fax:
| |

Email Address:
| email@email.com |

Other Names Used:
(e.g. maiden name, aliases, etc.)
| |
| |

Dates Names Used (MM/YYYY):
Start:   End:
| | |
| | |

Education Information

- Main Page
- View Results
- Administration
- Logout & Close

Background

502

Select Search Criteria ▽     [ ]   (Search) (Filter)

Current:
All applicants, Last Month    (Refresh List)

The list below contains all applicants for which background checks have been requested.
The list contains data on the most recent orders.

| Applicant ID | Name | SSN/NID | Total Orders | Submitted By | Submitted Date* | Status | |
|---|---|---|---|---|---|---|---|
| 11111 | Frank Jones | 000000000 | 2 | John Baselline | 01/14/2003 12:01 PM | 0% | New \| Delete |
| 11112 | Robert Smith | 000000000 | 1 | William Adams | 01/07/2003 4:04 AM | 0% | New \| Delete |
| 11113 | Kristi Smithers | 000000000 | 1 | Jonathon Crool | 01/06/2003 6:18 AM | 0% | New \| Delete |
| 11114 | Harry West | 000000000 | 1 | Sam Master | 12/16/2002 8:52 AM | 0% | New \| Delete |

Applicants: 1-4 of 4
Pages: << First < Prior Next > Last >>

FIG 6

Reports
- 📁 Applicant Letters
  - 📁 Pre-adverse Action
    - 📄 Report Letter
    - 📄 Report for Applicant
    - 📄 Summary of Consumer Rights
  - 📁 Adverse Action
    - 📄 Offer not extended
    - 📄 Offer withdrawn
- 📄 E-mail Applicants
- 📁 Applicant Reports
  - 📁 01/14/2003
  - 📁 01/14/2003
    - 📄 Education (0/1)
    - 📄 Employment (0/1)
    - 📄 Professional Reference (0/3)
    - 📄 SS Trace/Credit (0/1)
    - 📄 Court Records (0/1)
    - 📄 MVR (0/1)
  - 📁 01/13/2003

Background

The following disclosure is given in compliance with the requirements of the California Consumer Credit Reporting Agencies Act and Investigative Consumer Reporting Agencies Act pertaining to Investigative Consumer Reports:

1) This report does not guarantee the accuracy or truthfulness of the information as to the subject of the investigation, but only that it was accurately copied from public records. Evidence of identity theft may or may not be identified from this report.
2) The recipient of this report is required by law to provide a copy of this report to the subject of this report.
3) Failure to provide a copy of this report as required by law may expose you to liability as specified in section 1786.50* of the California Investigative Consumer Reporting Agencies Act.

*Go to www.hireright.com/pdfs/AB655.pdf to download the California Consumer Credit Reporting Agencies Act in PDF format, which includes the amended copy for section 1786.50 of the California Investigative Consumer Reporting Agencies Act.

Verification Results – Robert Smith

602

AUTOMATION AND STREAMLINING OF RECRUITING AND BACKGROUND SCREENING VIA BI-DIRECTIONAL COMMUNICATION AND PROCESS INTEGRATION

RELATED APPLICATIONS

The present patent application claims priority to and the benefit of the previously filed and currently pending provisional patent application, entitled "Methods and apparatus for automating and streamlining recruiting and background screening processes using bi-directional systems and process integration," filed on Jun. 29, 2006, and assigned Ser. No. 60/817,840 and which is hereby incorporated by reference.

BACKGROUND OF THE INVENTION

Organizations, such as companies, as well as individuals, are increasingly subject to background checks. For example, employers commonly perform background checks on prospective employees to ensure that the information they are providing on resumes and employment applications is truthful, and to locate other information regarding the prospective employees to secure a full picture of them. Background checks may be performed on organizations and individuals for other reasons as well. Background checks can be performed via background screening systems.

Furthermore, the status of applicants applying to an organization can be tracked using an applicant tracking system. However, currently available background screening systems have limited integration capabilities, and thus do not interact easily with applicant tracking systems. Responses are generally slow and there is no quick way to fix inaccurate or incomplete results. A typical flow of information within most of these systems is characterized by a single-direction flow of information, from an applicant tracking system to a background screening system, with no real-time status updating during the background screening process.

The background screening systems further do not have the ability to electronically invite the recruiter and/or applicant in completing any missing information required to perform the background screening process. Background screening systems also generally provide access to the background screening report at the end of the process. As such, the usefulness of current background screening systems is limited. For these and other reasons, therefore, there is a need for the present invention.

SUMMARY OF THE INVENTION

The present invention relates to automation and streamlining of recruiting and background screening via bi-directional communication and process integration. An embodiment of the invention includes an integration framework proxy and an integration framework. The integration framework proxy and the integration framework provide for integration of an applicant tracking system with the background screen system, such that bi-directional communication between the applicant tracking system and the background screening system occurs.

For example, at the integration framework proxy, first data representing a background screening order that is particular to an applicant tracking system may be generated, and second data representing the background screening order may be generated from the first data. The second data is generated based on the integration of the applicant tracking system with the background screening system. The second data is generic data not particular to any applicant tracking system. At the integration framework, the second data is transmitted from the integration framework proxy to the background screening system.

As a second example of functionality that can be performed, at the integration framework, a request for missing information of a background screening is conveyed from the background screening system to the applicant tracking system via the integration framework proxy. At the integration framework proxy, the missing information is received from the applicant tracking system as manually entered and transmitting the missing information to the background screening system via the integration framework. As a third example, at the integration framework, a status update regarding the background screening order is conveyed from the background screening system to the applicant tracking system via the integration framework proxy.

As a fourth example of functionality that can be performed, at the integration framework proxy, a request may be received from the applicant tracking system to view a report of the background screening order. First data representing the requested is generated, and second data representing the request is generated from the first data based on the integration of the applicant tracking system with the background screening system provided by the integration framework. Thereafter, at the integration framework, the second data is transmitted from the integration framework proxy to the background screening system. A report corresponding to the request is conveyed from the background screening system to the applicant tracking system via the integration framework proxy.

As a final example of functionality that can be performed, at the integration framework proxy, a request is received from the applicant tracking system to administratively log onto the background screening system. First data is generated that represents the request, and second data representing the request is generated from the first data based on the integration of the applicant tracking system with the background screening system provided by the integration framework. At the integration framework, the second data is transmitted from the integration framework proxy to the background screening system. As such, administrative functions are permitted to be performed at the background screening system from the applicant tracking system via the integration framework proxy.

Additional aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 2, 3, 4, 5, 6, and 7 are diagrams of user interfaces by which a user interacts with an applicant tracking system and/or a background screening system, according to various embodiments of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
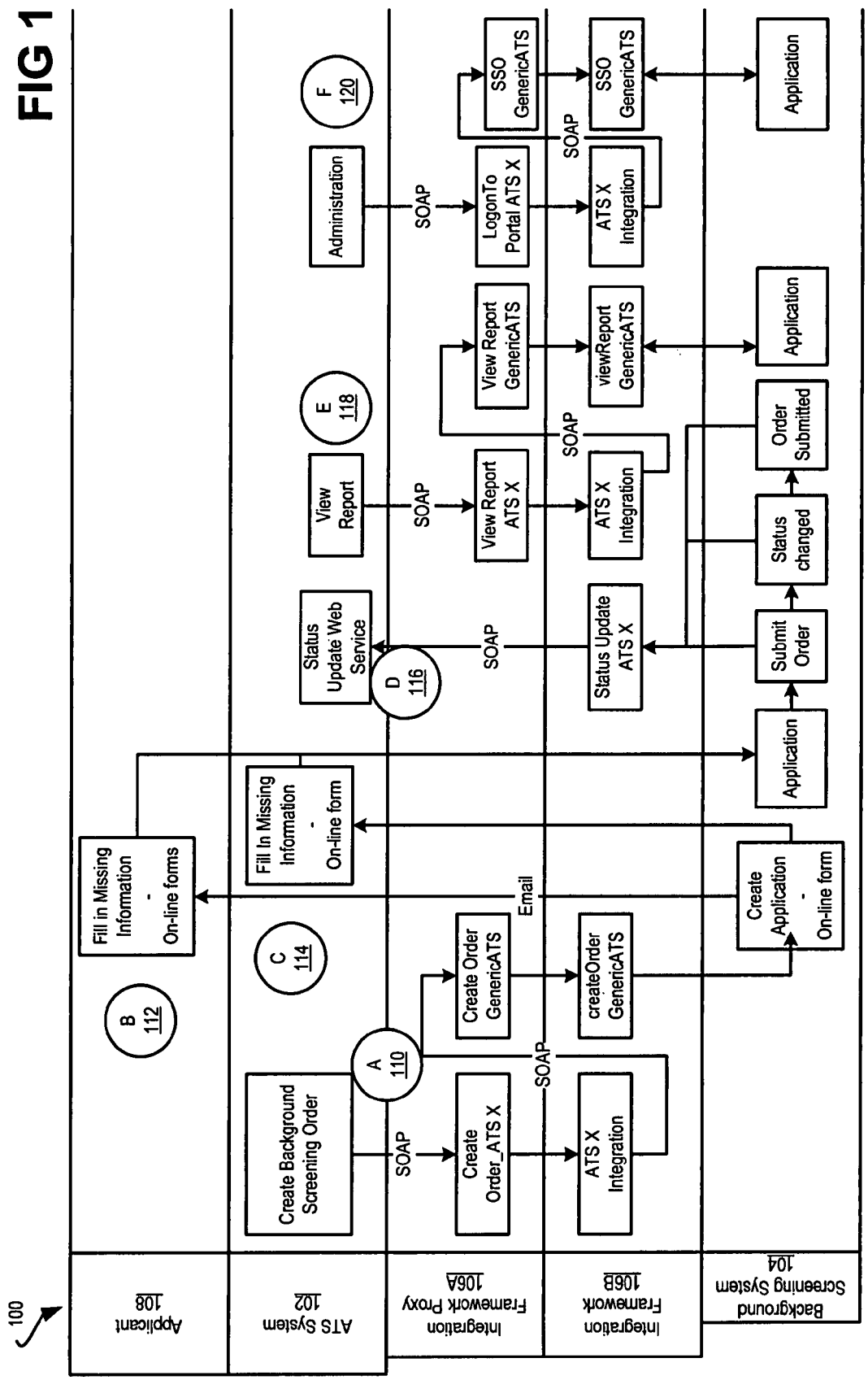
FIG. 1 is a diagram of a process flow by which integration of an applicant tracking system with a background screening system is achieved, according to an embodiment of the invention.

FIG. 1 shows a process flow 100 of data between an applicant tracking system 102 and a background screening system 104, according to an embodiment of the invention. The process flow 100 corresponds to a method in one embodiment of the invention. The applicant tracking system 102 is a system by which applicants of an organization can be tracked. The background screening system 104 is a system by which the applicant's backgrounds are checked, or screened.

The applicant tracking system 102 and the background screening system 104 are integrated with one another via an integration framework proxy 106A and an integration framework 106B. The proxy 106A and the framework 106B are implemented as systems in hardware, software, or a combination of software and hardware. The proxy 106A generally provides for receipt of information from and transmission of information to the applicant tracking system 102. The framework 106B generally provides for the integration of the applicant tracking system 102 and the background screening system 104, via the communication interfacing functionality provided by the proxy 106A.

Different functionalities of the process flow 100 are described in relation to parts 110, 112, 14, 116, 118, and 120. In part 110, an order for a background screening order is generated by the applicant tracking system 102, which is referred to as ATS X as a particular type or brand of applicant tracking system. The order is communicated to the proxy 106A via a simple object access protocol (SOAP) in one embodiment. The proxy 106A generates first date, represented as Order_ATS X in FIG. 1, that is particular to the applicant tracking system 102. Thereafter, the integration provided by the framework 106B between the applicant tracking system 102 and the background screening system 104 enables the proxy 106A to generate second data that represents the background screen order, from the first data, where the second data is generic data and not particular to any specific type of applicant tracking system, such as the system 102. The framework 106B transmits this order from the proxy 106A to the background screening system 104. Thus, information that is gathered throughout the normal operation of the applicant tracking system 102 is securely transmitted to the background screening system 104.

In parts 112 and 114, any additional background data can be collected. In particular, any missing information required to perform the background screening process can be collected, via the applicant tracking system 102 itself (part 114), or by inviting an individual to input the information directly into the background screening system (part 112). Thus, the integration framework 106B can convey a request for missing information, via email or via the applicant tracking system 102, from the background screening system 104 via the integration framework proxy 106A. The proxy 106A receives the missing information in one embodiment from the applicant tracking system 102 as manually entered, and transmits it to the background screening system 104 via the framework 106B. Alternatively, the missing information is manually entered at the background screening system 104 itself. The missing information is thus presented to the background screening system 104, which is identified as an "application" in FIG. 1.

In part 116, during the process of completing the background screening process, the background screening system 104 can send status updates to the applicant tracking system 102, so that the users of the system 102 have an accurate and up-to-date summary-level overview of where each applicant is in the screening process. Therefore, at the integration framework 106B, such a status update regarding the background screening order is conveyed from the background screening system 104 to the applicant tracking system 102. This update is conveyed via the integration framework proxy 106A.

In part 118, at any time during execution of the background screening process, users of the system 102 can access the background screening report as currently generated to view the report. Thus, the integration framework proxy 106A receives a request from the applicant tracking system 102 to view a report of the background screening order. The proxy 106A generates first data that represents the request and that is particular to the system 102. The proxy 106A generates second data representing the request, from the first data, based on the integration of the applicant tracking system 102 with the background screening system 104. The second data represents the request in a more generic fashion, and is not particular to any type of applicant tracking system, such as the system 102. The integration framework 106B then transmits the second data from the proxy 106A to the system 104, and conveys the corresponding report from the system 104 to the system 102 via the proxy 106A for viewing by the user.

In part 120, administrative capabilities for the background screening system 104 may be provided to users of the applicant tracking system 102 through the system 102 itself. Thus, the integration framework proxy 106A receives a request from the applicant tracking system 102 to administratively log onto the background screening system 104. The proxy 106A generates first data that represents the request and that is particular to the system 102. The proxy 106A generates second data representing the request, from the first data, based on the integration of the applicant tracking system 102 with the background screening system 104. The second data represents the request in a more generic fashion, and is not particular to any type of applicant tracking system, such as the system 102. The integration framework 106B then transmits the second data from the proxy 106A to the system 104, permitting administrative functions to be performed at the background screening system 104 from the applicant tracking system 102 via the proxy 106A. It is noted that SSO in FIG. 1 stands for single sign-on, and that ATS stands for applicant tracking system. Furthermore, an on-line form can in one embodiment be a form presented on a web page that is capable of being filled out electronically on the web page itself.

Technical specifications by which the applicant tracking system 102 can interact with the background screening system 104 via the proxy 106A and the framework 106B are now presented. There are two common integration scenarios. The first is interactive integration. The system 102 may send the system 104 initial data for a potential candidate, whereupon the recruiter in question is redirect to a web site to determine the type of background screening that is to be ordered. There are two steps in this process: a web service or SOAP request to the system 104 that includes authentication information; and, a universal resource locator (URL) address that is returned to redirect the user into the application of the system 104. In this fashion, no user name or password data has to be passed by way of browser parameters or hidden fields.

Figure 2:
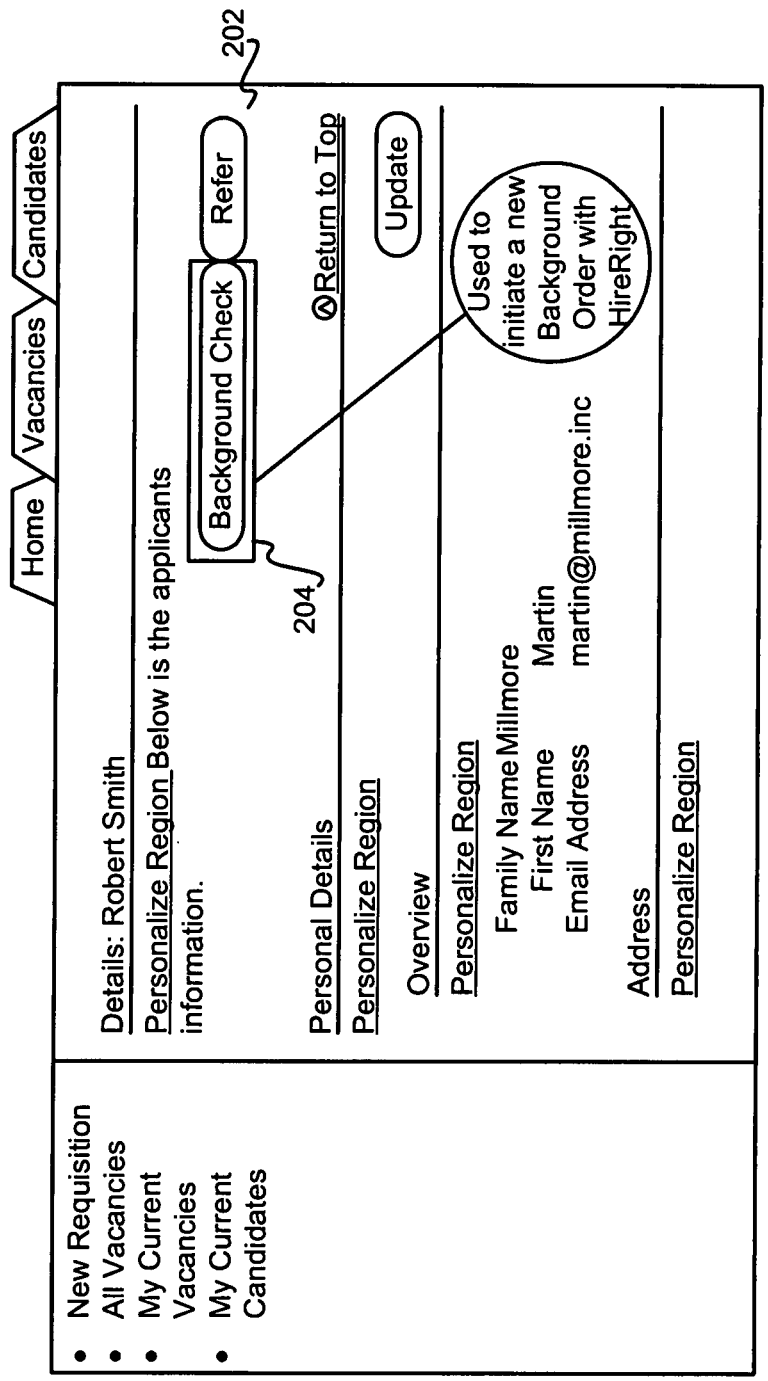

Access to the system 104 can occur in three ways. First, a new pre-employment background check request may be submitted. The system 102 may include an interface to the vendor of the system 104, such that there is a page within the system 102 by which a background order can be placed. For example, FIG. 2 shows a user interface 202 by which a user selects a background check via the button 204, according to an embodiment of the invention.

When the user requests a new background check, a SOAP authentication message is sent that includes the relevant, previously captured candidate information to the system 104 (via the proxy 106A and the framework 106B). The system 104 then returns a URL (again via the proxy 106A and the framework 106B) by which the user can choose a desired package and select a manner by which previously uncollected data is selected. For example, FIG. 3 shows a user interface 302 in which a user has selected a custom background check to be performed, according to an embodiment of the invention.

The system 102 may not have captured all of the information needed to perform a background check, such as social security number, birth date, and so on. Therefore, the user may enter this information directly into the system 104 via a URL that was returned, or can forward the information via email, or through the system 102. FIG. 4 shows a user interface 402 by which a user enters this missing information via the former approach, according to an embodiment of the invention.

The second way in which access to the system 104 can occur is via a pre-employ status request. When the user wishes to see a detailed status of a candidate's background check report, such as the report itself, through the system 102, a SOAP authentication message is sent to the system 104 that returns a redirection URL to the appropriate page within the application of the system 104. The system 102 may have a listing page that displays the current status of all background orders. FIG. 5 shows a user interface 502 of such a listing page, according to an embodiment of the invention.

In the example of FIG. 5, when a user clicks on an application ID link, the system 102 sends a SOAP request to the system 104 (again, via the proxy 106A and the framework 106B) requesting a URL to view the background order associated with the applicant in question. When this URL is returned, the browser window is redirected to display the order. FIG. 6 shows a user interface 602 of a report of such an order, according to an embodiment of the invention.

Figure 7:
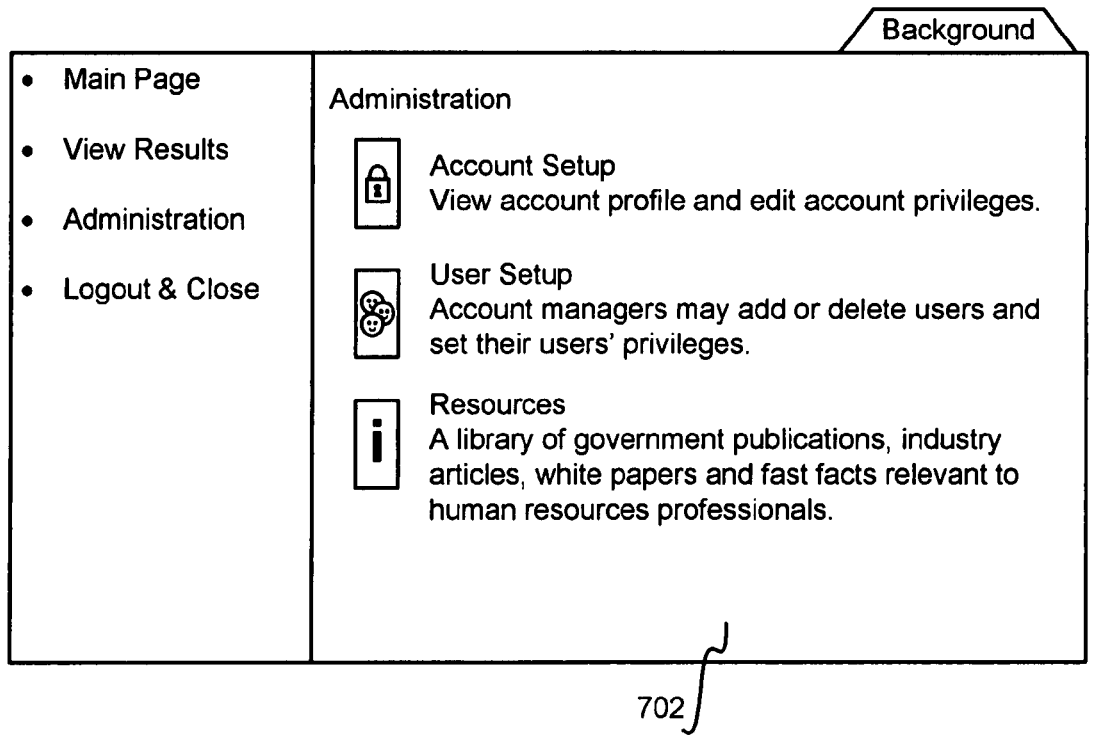

The third way in which access to the system 104 can occur is via vendor administrator. If the user of the system 102 has appropriate permission, he or she can choose to edit various properties of the system 104. When this activity is requested when the user is within the system 102, a SOAP authentication messages is sent to the system 104 (via the proxy 106A and the framework 106B) that returns a redirection URL to the appropriate page within the application of the system 104. FIG. 7 shows a user interface 702 of the administrative settings of the system 104 that may be modifiable by a user of the system 102, according to an embodiment of the invention.

The second common integration scenario is faceless integration. Faceless integration means that there is no direct interaction between the user of the system 102 and the system 104. Instead, applicant data is sent to the system 104, and various trigger points within the system 102 in turn initiate actions within the system 104. For example, when an event occurs to initiate a final interface, that may in turn result in a message being sent to the system 104 to begin the background screening. As another example, event-driven electronic data exchange may occur when the background report is completed, such that the report is sent electronically to the system 102 from the system 104, such that the recruiter or other user can view it directly within the system 102, as opposed to via a link (e.g., a URL) to a page within the system 104.

In some situations, a combination of these two integration scenarios may be achieved. In some instances, for example, depending upon the user experience desired, it may be preferred to have the user land directly on the web site of the system 104. That is, in many cases, it may be difficult for the system 102 to encapsulate the functionality available through the web site of the system 104 directly. In other cases, however, the desired interaction can take place in a faceless manner, using a web service electronic exchange of data from the system 104 to the system 102, such that the user of the system 102 never directly interacts with the system 104.

Any that that an interactive integration between the systems 102 and 104 is needed introduces the need for a single sign-on between the system 102 and the system 104. In one embodiment, the proxy 106A and the framework 106B use a web services, SOAP-based solution to provide security and convenience during this sign-on process. This mechanism works as follows.

When a user initiates a link that is intended to redirect him or her to a web page within the system 104, a SOAP web service call is made to the system 104 from the system 102. Included in the data envelope are credential information, optional data that may be needed by the system 104, and a key to indicate where within the system 104 to land. A return URL web link is also provided where any post-back data is to be sent.

Second, upon receiving the request, the system 104 verifies authorization and optionally processes any additional data provided in the request. The system 104 then returns, as the synchronous web-service response, a web link that is used by the system 102 to redirect the user. It is the URL to the landing page on the system 104. The URL contains a hashed, single-use-only session ID that permits just one entry through this URL. The system 102 then receives the response from the system 104, and issues a browser redirect, such as through client-side Javascript code, or a server-side redirect. The user is thus seamlessly navigated to the web site of the system 104, at the desired page.

Once the user has finish his or her work within the system 104, a button or link can appear that provides the user with navigation back to the system 102. This page contains a form with a hidden text-area eXtended Markup Language (XML) content. This data contains the action acknowledgment identifier that may be needed by the system 102 for data synchronization. The form action URL is the one specified during the initial request to the system 104, and represents an address on the system 102. Since the user is the one who is posting the data back to the system 102, no firewall changes are needed.

Once a background check order has been placed with the system 104, the system 104 can send periodic status and expense updates to the system 102. These updates include updates regarding pre-employing background status, which are summary updates on the status of the various background services being requested. The updates also include updates regarding pre-employment expense, which are information on what charges apply for a given order. The updates may further include updates regarding pre-employment background report, which are the results of the background report to be sent upon completion. These updates are sent via a synchronous or asynchronous SOAP message to the server 102 in one embodiment of the invention.

Particular documents are now described that can be sent via a SOAP envelope over HTTPS from the server 102 to the server 104. In the initial background order, three types of documents may be involved. A PunchoutRequest document is that which initiates the data transfer from the server 102 to the server 104. The PunchoutResponse document is the reply to the former document, and contains optional web links and/or other processing-relevant data to be shared with the server 102. An optional PunchoutOrderMessage may include confirmation data returned by the system 104 to the user by way of a form submission.

Figure 8:
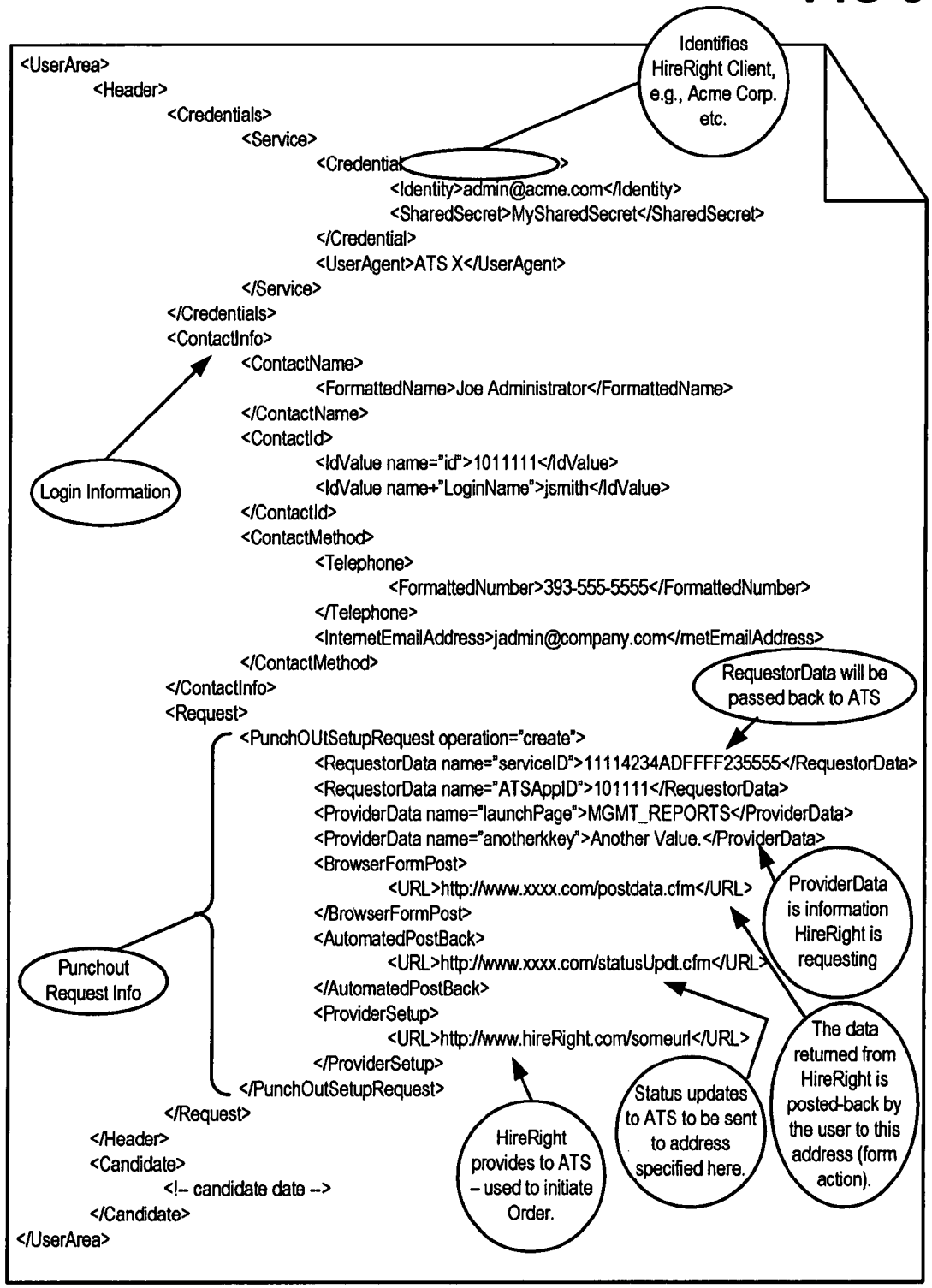
FIGS. 8 and 9 are diagrams of example documents sent from an applicant tracking system to a background screening system via an integration framework and an integration framework proxy, according to an embodiment of the invention.
Figure 9:
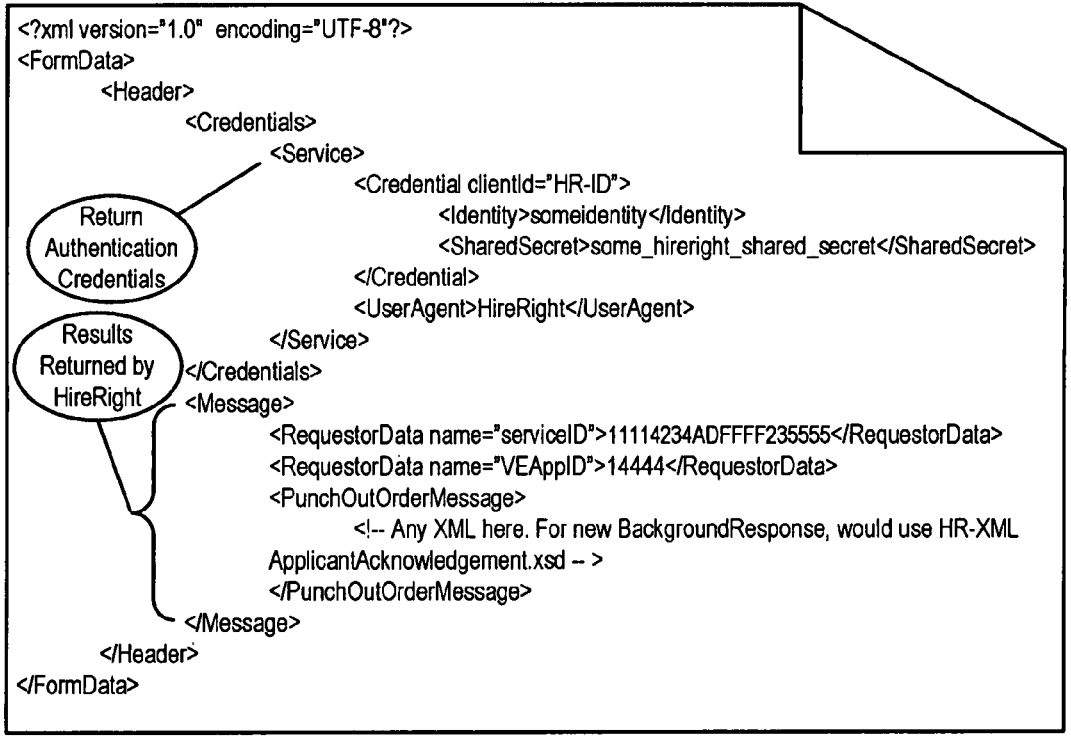

The PunchoutRequest message data can be described by reference to the contents of a representative such message, as depicted in FIG. 8. In this particular example, a recruiter is initiating the process to begin background screening. The data present in the system 104 is sent within the Candidate node. It is noted that credential information, as well as a URL to use for eventual post-back of the data, is also present. For certain types of requests such as these, additional information, such as where to post eventual status messages, can also be provided, but may not always be relevant. The PunchoutResponse message data can further be described by reference to the contents of a representative such message, as depicted in FIG. 9. The response message is generated after the data has been processed by the system 104, and is terser in format.

When markup-language documents, such as XML documents, are sent to the system 104 from the system 102, via the proxy 106A and the framework 106B, certain data elements have to be present for the data exchange to be completed. These elements contain information that identifies which company and recruiter, for instance, are sending the data. Four common XML schema definitions are incorporated into every request sent to the system 104. These are: Admin, Organization, UserArea, and ATSArea.

Figure 10:
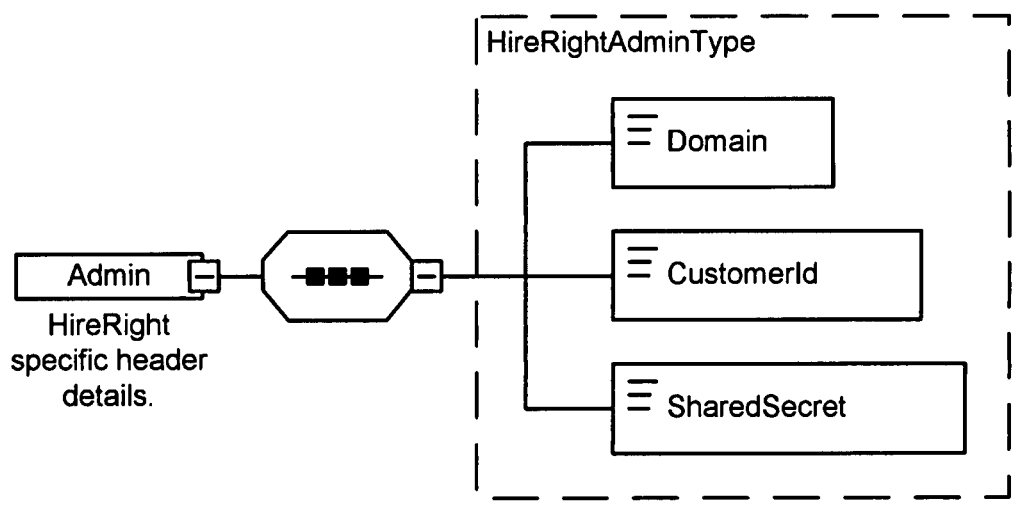
FIGS. 10, 11, 12, and 13 are diagrams of various markup-language schema definitions, according to different embodiments of the invention.

FIG. 10 shows the Admin XML schema definition, according to an embodiment of the invention. The Domain is of type xsd:string, and is the domain of the system 104. The CustomerID is of type xsd:string, is the customer ID assigned to the client of the system 102 in question. The SharedSecret is of type xsd:string, and is a shared secret of the client, such as a password.

Figure 11:
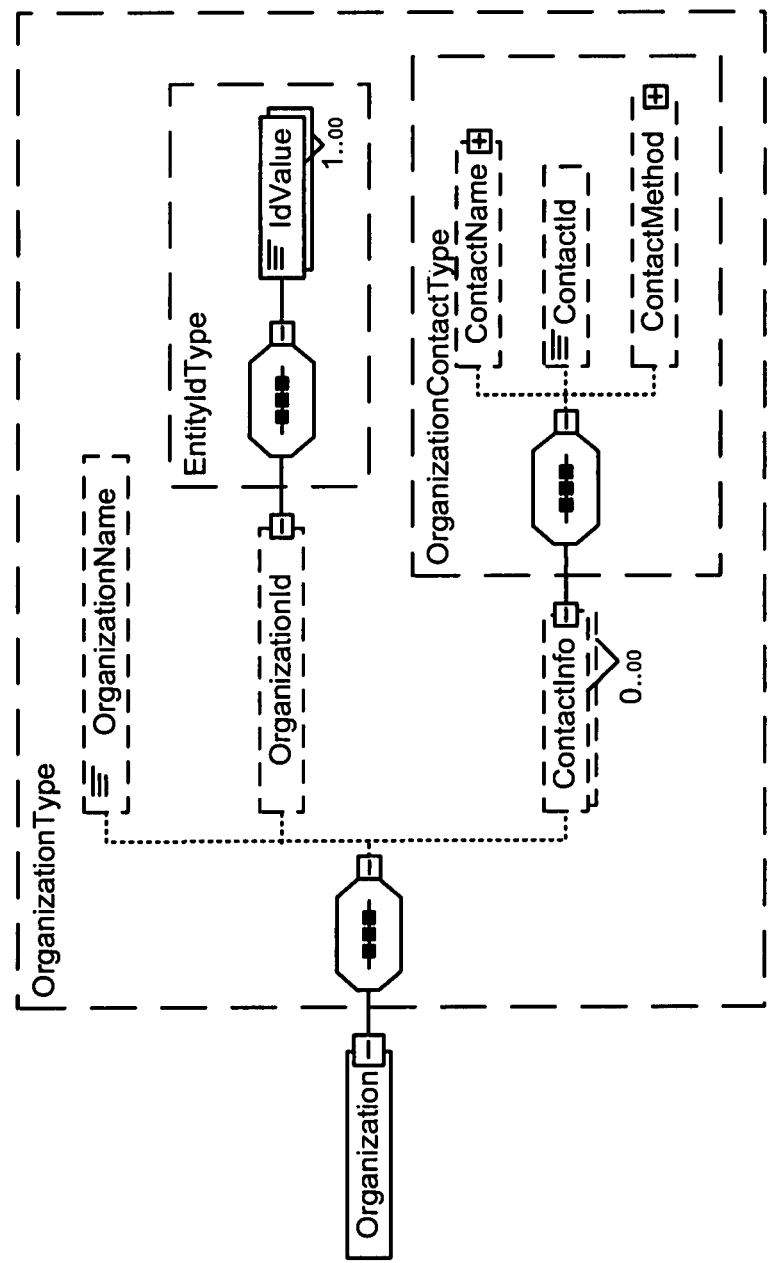

FIG. 11 shows the Organization XML schema definition, according to an embodiment of the invention. This schema definition is a subset of the Organization XML schema defined in the HR-XML standard, available at http://ns.hr-xml.org/2_3/HR-XML-2_3/CPO/Organization.html, as can be appreciated by those of ordinary skill within the art. The ContactInfo segment here refers to information about the administrator or other contact of the system 102.

Figure 12:
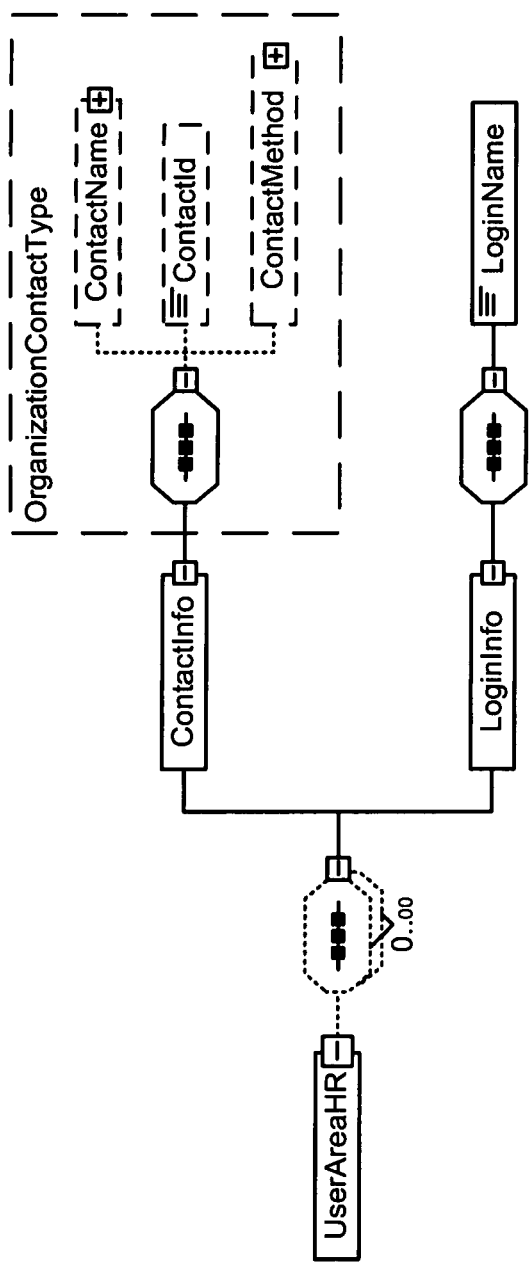

FIG. 12 shows the UserArea XML schema definition, according to an embodiment of the invention. The UserAreaHR fragment is used to define information about the recruiter who is requesting to view or create a background screening order. It extends the HR-XML UserArea XML schema in accordance with that specification, available at http://ns.hr-xml.org/2_3/HR-XML-2_3/CPO/HRXMLExtension.html. The ContactInfo element follows the HR-XML standard for expression contact information, available at http://ns.hr-xml.org/2_3/HR-XML-2_3/CPO/Contact-Method.html. In this instance, the system 104 uses an abbreviated version of that schema to avoid complexity. The ContactInfo segment is used to provide information about the user of the system 102, who is thus the user of the system 104 as well. The LoginName represents the login name that the user or recruiter has within the system 102.

Figure 13:
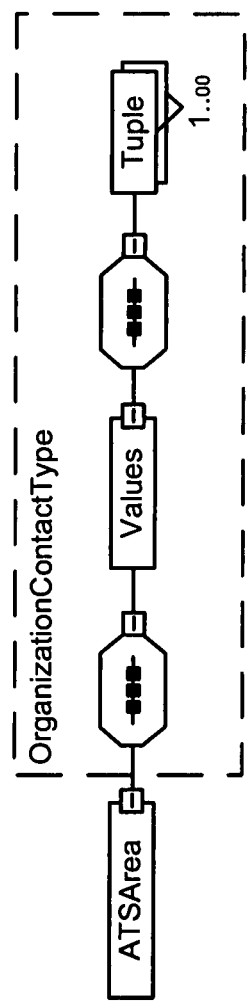

FIG. 13 shows the ATSArea XML schema definition, according to an embodiment of the invention. The ATSArea XML fragment can be used by the system 102 to send any data to the system 104 that it wishes to have sent back in reply. Any data sent by the system 102 in this segment is returned unmodified. The Tuple represents simple name/value type pairs expressed in XML.

In one embodiment, there are three standard XML documents that can be sent to the system 104 in the form of SOAP-based web services. Assuming that the inbound document to the system 104 is successfully processed, the synchronous reply contains a URL that the system 102 uses to redirect the user's browser window location.

Figure 14A:
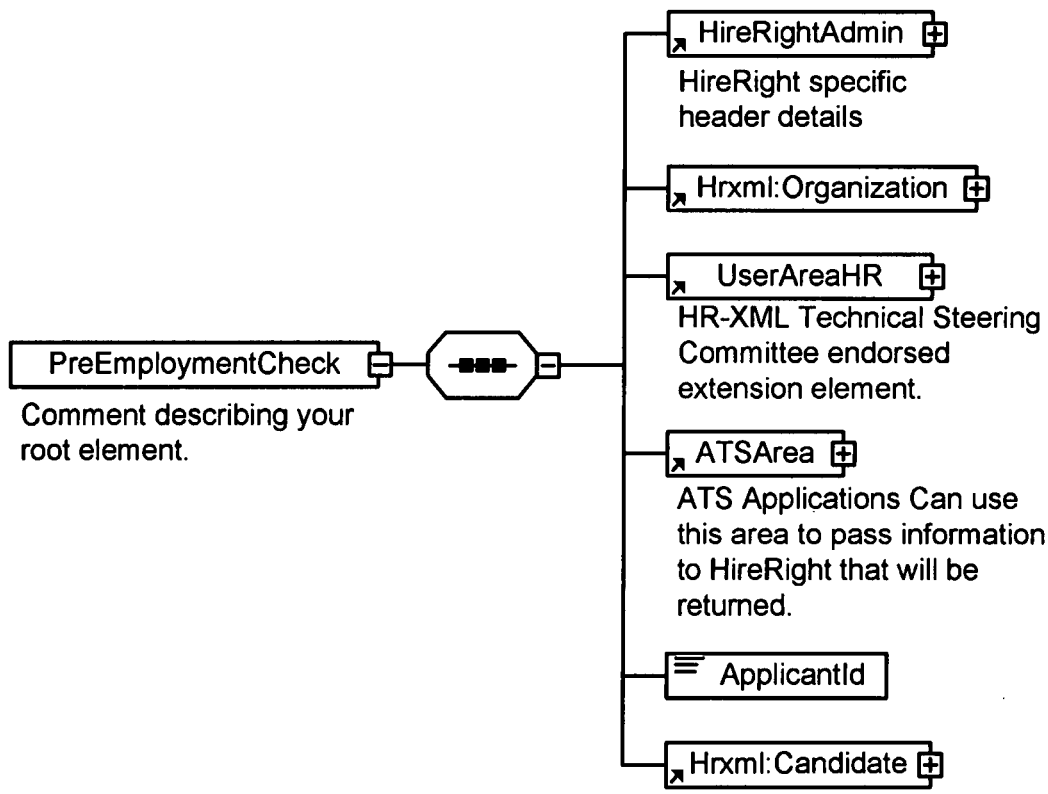
FIGS. 14A and 14B are diagrams of schemas for a request and a response, respectively, for ordering a background check, according to an embodiment of the invention.
Figure 14B:
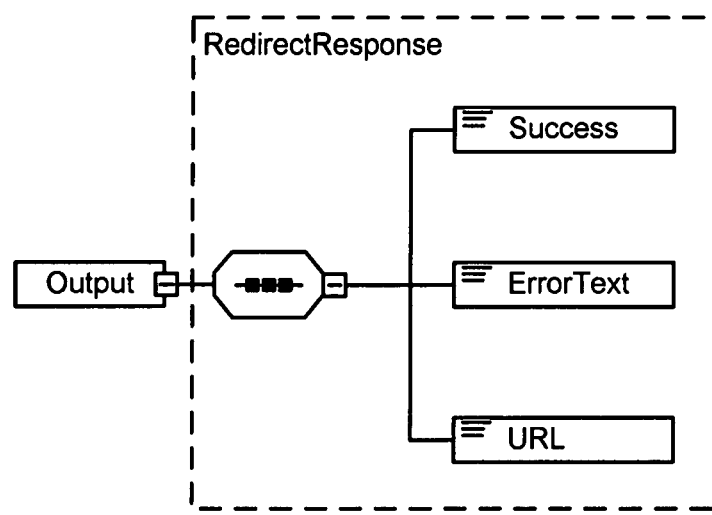

FIG. 14A shows one such document sent to the system 104, and FIG. 14B shows the response to such a document sent by the system 104, according to an embodiment of the invention. This PreEmploymentCheck web service is responsible for initiating the creation of the background order on the system 104. It transmits any relevant information that has been collected on the subject applicant within the system 102 to the system 104. This is done by way of the HR-XML Candidate XML schema fragment that is included in this request. The first four elements of FIG. 14A are the Common segments, with ApplicantID being the identifier for the Applicant within the system 102, and the Candidate segment the HR-XML specification for the Candidate in question. The response is returned as in FIG. 14B, where if Success is 0, the request was successfully processed and the URL contains the browser redirection value. If Success is anything other than 0, then this indicates failure, with ErrorText containing the error details.

Figure 15A:
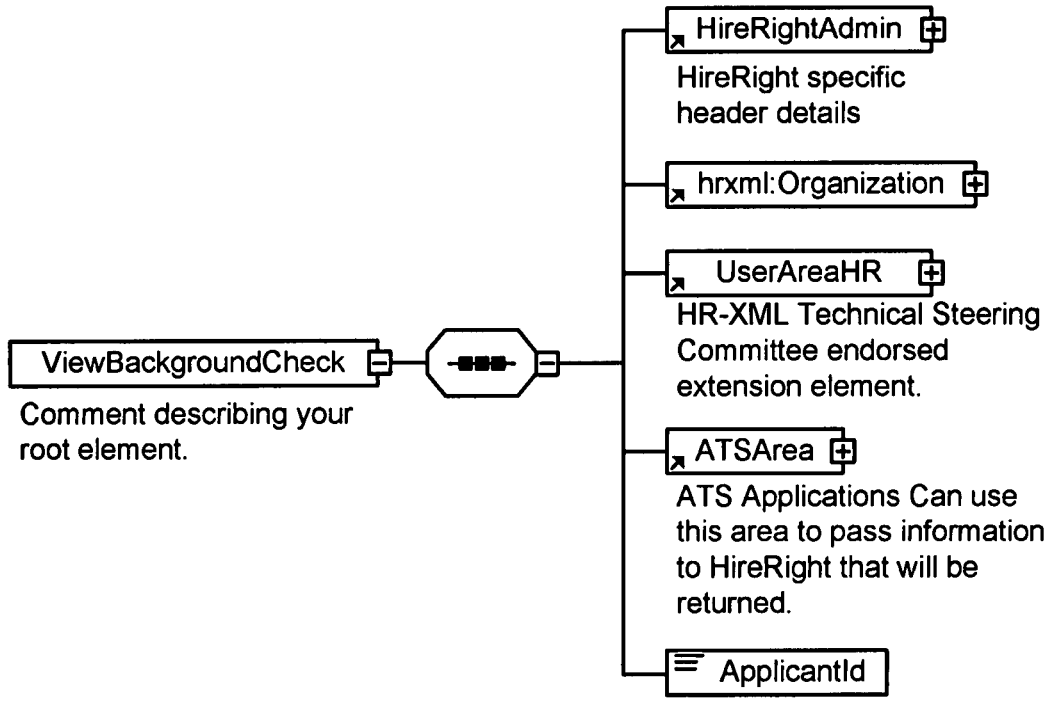
FIGS. 15A and 15B are diagrams of schemas for a request to a background screening system and a response sent by the background screening system, respectively, for viewing a background check, according to an embodiment of the invention.
Figure 15B:
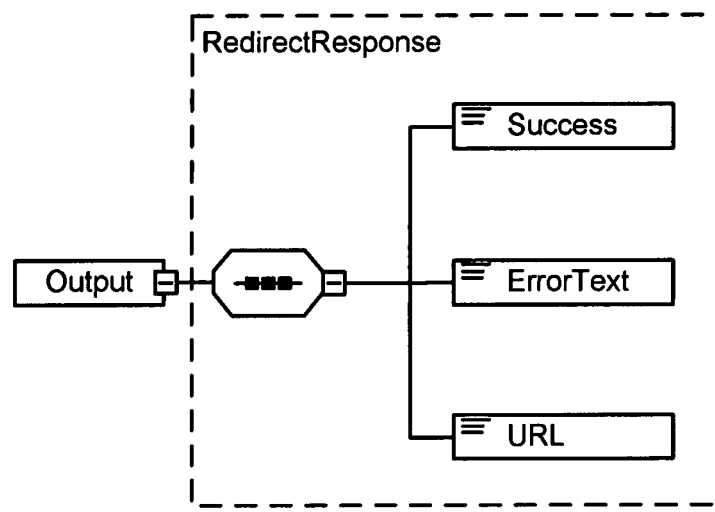

FIG. 15A shows another such document sent to the system 104, and FIG. 15B shows the response to such a document sent by the system 104, according to an embodiment of the invention. The ViewBackgroundCheck service is used to provide the recruiter the ability to view the background order for a given applicant. The SOAP message that is sent to the system 104 contains the common header fields along with the ApplicantId. What is returned, in FIG. 15B, in the response is a URL string that the user's browser should be redirected. If Success is 0, the request was successfully processed and the URL contains the browser redirection value, and otherwise failure is indicated, with ErrorText containing the error details.

Figure 16A:
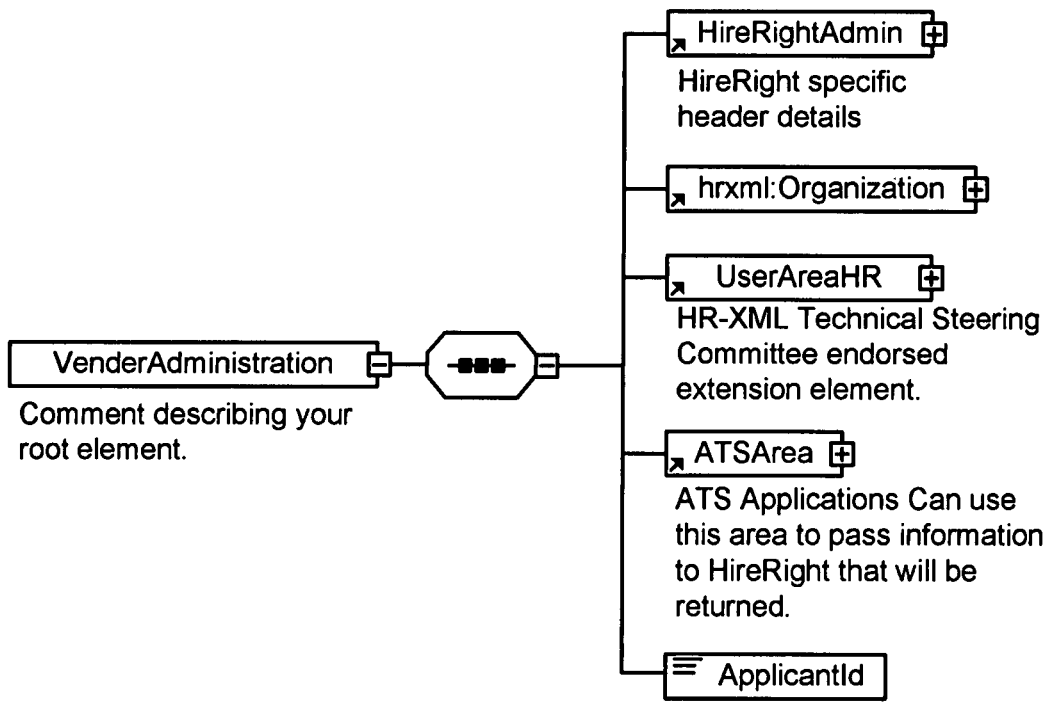
FIGS. 16A and 16B are diagrams of schemas for a request to a background screening system and a response sent by the background screening system, respectively, for performing administrative functionality, according to an embodiment of the invention.
Figure 16B:
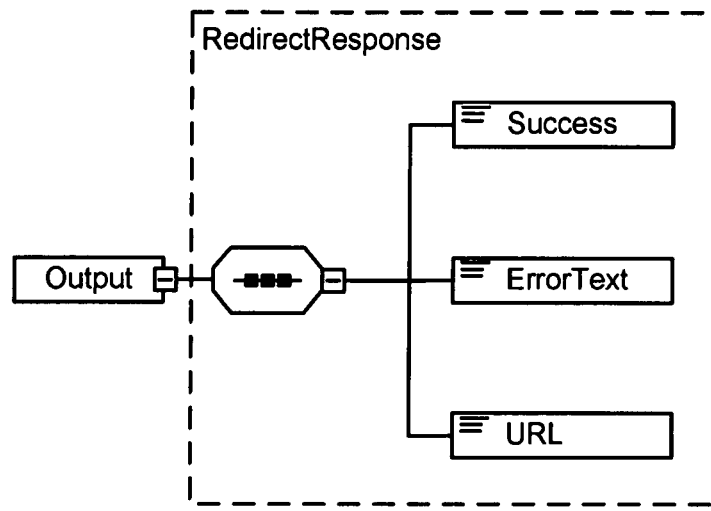

FIG. 16A shows another such document sent to the system 104, and FIG. 16B shows the response to such a document sent by the system 104, according to an embodiment of the invention. The VendorAdministration web service is used to make administration functions of the system 104 available to users of the system 102 who have this privilege. These functions are available through the web site of the system 104, and thus a user of the system 102 requests access to this feature, and if approved, has his or her browser redirected from the system 102 to the system 104. The outgoing SOAP request that is used to authentication the user is identical in structure to the ViewBackgroundCheck service. The common header elements are present, along with the applicant identifier. What is returned, in FIG. 15B, is a response containing the URL of the browser redirection value where Success is 0, and otherwise, where Success is non-zero, the ErrorText contains the details of the error.

In addition to documents being sent from the system 102 to the system 104, there are documents sent from the system 104 to the system 102 (as originated by the system 104, as opposed to being a response by the system 104 to a request initiated at the system 102). Status and expense information regarding a background order, for instance, are transmitted on a regular basis from the system 104 to the system 102. These are event-driven notifications that provide the recruiter or the user of the system 102 with near-time updates on activities that pertain to his or her order. Since the system 102 can list these statuses in line-summary fashion in one embodiment, it can eliminate the need for the recruiter to have to drill-down into each specific order to gather updated information.

Figure 17A:
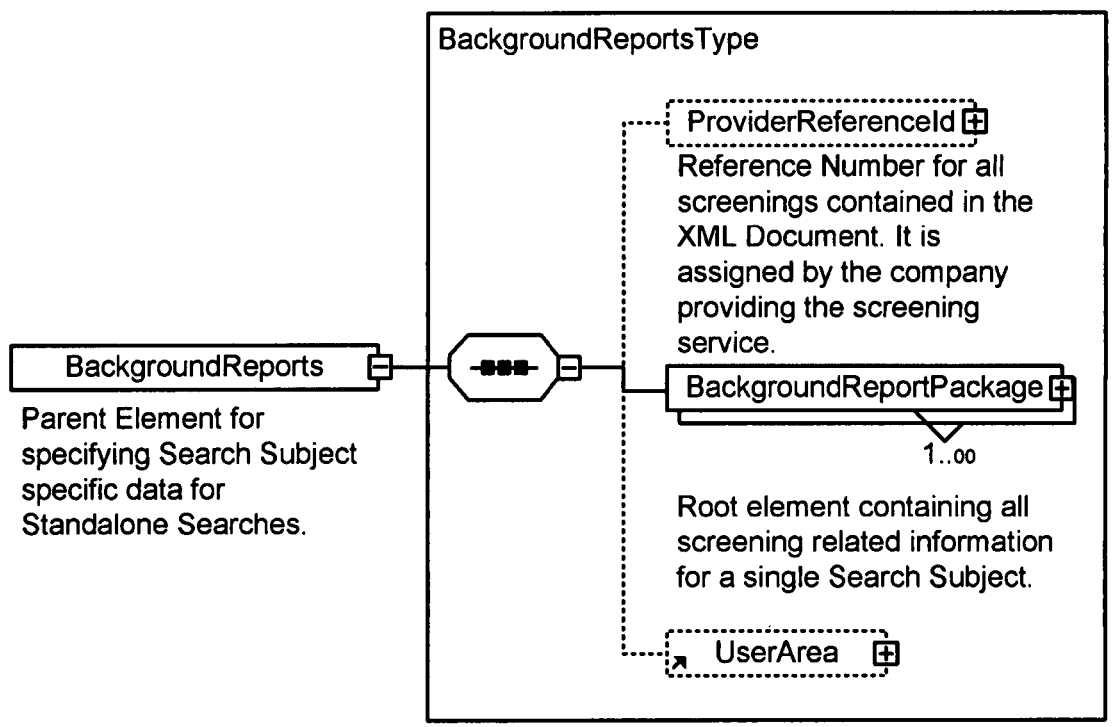
FIGS. 17A and 17B are diagrams of schemes for a message sent by a background screening system and a message response to the background screening system, respectively, for providing status update information, according to an embodiment of the invention.
Figure 17B:
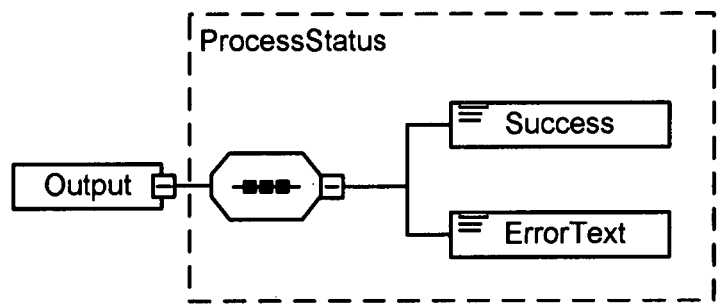

FIG. 17A shows one such document sent to the system 102, and FIG. 17B shows the response to such a document sent by the system 102, according to an embodiment of the invention. The PreEmploymentStatus web service is a SOAP-based web service call that is sent by the system 104 to the system 102. The XML payload contains the data in the HR-XML BackgroundReport specification format available at http://ns.hr-xml.org/2_3/HR-XML-2_3/Screening/BackgroundReports.html. Within the BackgroundReportPackage substantial information is contained about the current status of the background order in question. The reply to this message, in FIG. 17B, has a very brief XML schema, where a Success value of 0 indicates successful processing by the system 102, and otherwise a non-zero value indicates that ErrorText provides error or failure information.

Figure 18A:
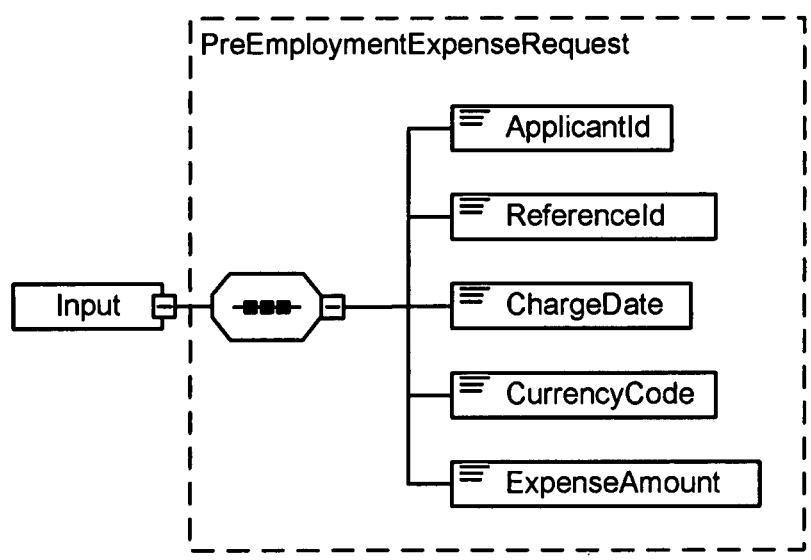
FIGS. 18A and 18B are diagrams of schemes for a message sent by a background screening system and a message response to the background screening system, respectively, for providing expense information, according to an embodiment of the invention.
Figure 18B:
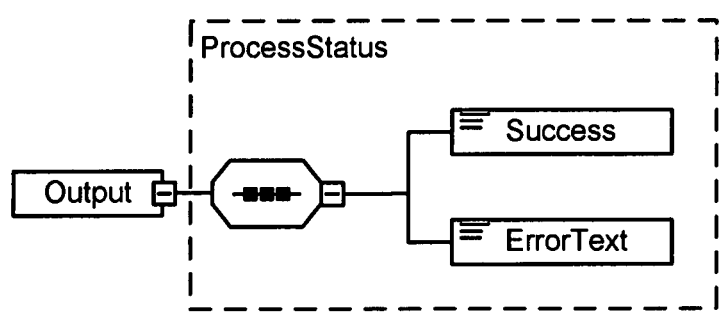

FIG. 18A shows another such document sent to the system 102, and FIG. 18B shows the response to such a document sent by the system 102, according to an embodiment of the invention. The PreEmploymentExpense web service message sent from the system 104 to the system 102 provides order expense related information. The ApplicantID element contains the Applicant's ID as defined within the system 102 The ReferenceID is the internal ID of the system 104 as assigned to the Applicant in question. The ChargeData is the date of the expense, and the CurrencyCode specifies the type of currency used. The ExpenseAmount is the amount of the charge itself. The synchronous response to this message, in FIG. 18B, is the same as in FIG. 17B, such that a Success value of 0 indicates successful processing, and otherwise a non-zero value indicates that ErrorText provides error or failure information.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
    at an integration framework proxy comprising a processor for executing computer executable code, wherein said computer executable code, at least in part, generates first data representing a background screening order particular to an applicant tracking system;
    at an integration framework comprising a processor for executing computer executable code, wherein said computer executable code, at least in part, provides an integration of the applicant tracking system with a background screening system;
    at the integration framework proxy, wherein said computer executable code further generates second data representing the background screening order from the first data based on the integration of the applicant tracking system with the background screening system, the second data being generic data not particular to any applicant tracking system;
    at the integration framework, transmitting the second data from the integration framework proxy to the background screening system, wherein the integration framework proxy and the integration framework provide for integration of the applicant tracking system with the background screening system such that bi-directional communication between the applicant tracking system and the background screening system occurs; and
    at the integration framework, conveying an update regarding status and/or expense information concerning the background screening order from the background screening system to the applicant tracking system via the integration framework proxy.

2. The method of claim 1, further comprising:
    at the integration framework, conveying a request for missing information of a background screening from the background screening system to the applicant tracking system via the integration framework proxy; and,
    at the integration framework proxy, receiving the missing information from the applicant tracking system, and transmitting the missing information to the background screening system via the integration framework, or from the applicant;
    wherein the applicant tracking system is configured to allow for manual input of the requested missing information.

3. The method of claim 1, further comprising:
    at the integration framework proxy,
    receiving a request from the applicant tracking system to view a report of the background screening order;
    generating first data representing the request;
    generating second data representing the request from the first data based on the integration of the applicant tracking system with the background screening system provided by the integration framework;

at the integration framework,
transmitting the second data from the integration framework proxy to the background screening system; and,
conveying a report corresponding to the request from the background screening system to the applicant tracking system via the integration framework proxy.

4. The method of claim 1, further comprising:
at the integration framework proxy,
receiving a request from the applicant tracking system to administratively log onto the background screening system;
generating first data representing the request;
generating second data representing the request from the first data based on the 5 integration of the applicant tracking system with the background screening system provided by the integration framework;
at the integration framework,
transmitting the second data from the integration framework proxy to the background screening system; and,
permitting administrative functions to be performed at the background screening system from the applicant tracking system via the integration framework proxy.

5. The method of claim 1, wherein the status information includes information regarding components included in the background screening order.

6. The method of claim 1, wherein the update is conveyed to the applicant tracking system upon a change in status and/or expense information concerning the background screening order.

7. The method of claim 1, wherein the update is conveyed to the applicant tracking system synchronously or asynchronously.

8. A method comprising:
providing an integration framework proxy comprising a processor for executing computer executable code, wherein the computer executable code, at least in part, generates first data representing a background screening order particular to an applicant tracking system; and,
providing an integration framework comprising a processor for executing computer executable code, wherein the computer executable code, at least in part, integrates the applicant tracking system with a background screening system,
wherein at the integration framework proxy, said computer executable code further generates second data representing the background screening order, from the first data, based on the integration of the applicant tracking system with the background screening system, the second data being generic data not particular to any applicant tracking system,
wherein the integration framework transmits the second data from the integration framework proxy to the background screening system,
wherein the integration framework proxy and the integration framework provide for integration of the applicant tracking system with the background screening system such that bi-directional communication between the applicant tracking system and the background screening system occurs; and
wherein at the integration framework, conveying an update regarding status and/or expense information concerning the background screening order from the background screening system to the applicant tracking system via the integration framework proxy.

9. The method of claim 8, wherein:
at the integration framework, a request for missing information of a background screening is conveyed from the background screening system to the applicant tracking system via the integration framework proxy; and,
at the integration framework proxy, the missing information from the applicant tracking system is received and transmitted to the background screening system via the integration framework; and
wherein the applicant tracking system is configured to allow for manual input of the requested missing information.

10. The method of claim 8, wherein:
at the integration framework proxy,
a request is received from the applicant tracking system to view a report of the background screening order;
first data representing the request is generated;
second data representing the request is generated from the first data based on the integration of the applicant tracking system with the background screening system provided by the integration framework;
at the integration framework,
the second data is transmitted from the integration framework proxy to the background screening system; and,
a report corresponding to the request from the background screening system is conveyed to the applicant tracking system via the integration framework proxy.

11. The method of claim 8, wherein the status information includes information regarding components included in the background screening order.

12. The method of claim 8, wherein the update is conveyed to the applicant tracking system upon a change in status and/or expense information concerning the background screening order.

13. The method of claim 8, wherein the update is conveyed to the applicant tracking system synchronously or asynchronously.

14. A system comprising:
an integration framework proxy comprising a processor for executing computer executable code which, at least in part, generates first data representing a background screening order particular to an applicant tracking system based, at least in part, on a background screening order request from an applicant tracking system; and,
an integration framework comprising a processor for executing computer executable code which, at least in part, integrates the applicant tracking system with a background screening system,
wherein second data is generated by the integration framework proxy representing the background screening order, from the first data, based on the integration of the applicant tracking system with the background screening system, the second data being generic data not particular to any applicant tracking system,
wherein the integration framework transmits the second data from the integration framework proxy to the background screening system,
wherein the integration framework proxy and the integration framework provide for integration of the applicant tracking system with the background screening system such that bi-directional communication between the applicant tracking system and the background screening system occurs; and
wherein at the integration framework, an update is conveyed regarding status and/or expense information concerning the background screening order from the background screening system to the applicant tracking system via the integration framework proxy.

15. The system of claim 14, wherein:
at the integration framework, a request for missing information of a background screening is conveyed from the background screening system to the applicant tracking system via the integration framework proxy;
at the integration framework proxy, the missing information from the applicant tracking system is received and transmitted to the background screening system via the integration framework; and
the applicant tracking system is configured to allow for the manual input of requested missing information.

16. The system of claim 14, further comprising the applicant tracking system.

17. The system of claim 14, further comprising the background screening system.

18. The system of claim 14, further comprising the applicant tracking system and the background screening system.

19. The system of claim 14, wherein:
at the integration framework proxy,
a request is received from the applicant tracking system to view a report of the background screening order;
first data representing the request is generated;
second data representing the request is generated from the first data based on the integration of the applicant tracking system with the background screening system provided by the integration framework;
at the integration framework,
the second data is transmitted from the integration framework proxy to the background screening system; and,
a report corresponding to the request from the background screening system is conveyed to the applicant tracking system via the integration framework proxy.

20. The system of claim 14, wherein:
at the integration framework proxy,
a request is received from the applicant tracking system to administratively log onto the background screening system;
first data representing the request is generated;
second data representing the request is generated from the first data based on the integration of the applicant tracking system with the background screening system provided by the integration framework;
at the integration framework,
the second data is transmitted from the integration framework proxy to the background screening system; and,
administrative functions are permitted to be performed at the background screening system from the applicant tracking system via the integration framework proxy.

21. The system of claim 14, wherein the status information includes information regarding components included in the background screening order.

22. The system of claim 14, wherein the update is conveyed to the applicant tracking system upon a change in status and/or expense information concerning the background screening order.

23. The system of claim 14, wherein the update is conveyed to the applicant tracking system synchronously or asynchronously.

* * * * *

UNITED STATES PATENT AND TRADEMARK OFFICE
CERTIFICATE OF CORRECTION

| | | |
|---|---|---|
| PATENT NO. | : 9,037,517 B2 | Page 1 of 1 |
| APPLICATION NO. | : 11/700697 | |
| DATED | : May 19, 2015 | |
| INVENTOR(S) | : Stefano Malnati et al. | |

It is certified that error appears in the above-identified patent and that said Letters Patent is hereby corrected as shown below:

In the Claims

In claim 4, at col. 11, line 14, delete "5."

Signed and Sealed this
Eighth Day of September, 2015

Michelle K. Lee
*Director of the United States Patent and Trademark Office*